(No Model.)
C. R. DAVENPORT.
BICYCLE.
No. 420,145. Patented Jan. 28, 1890.
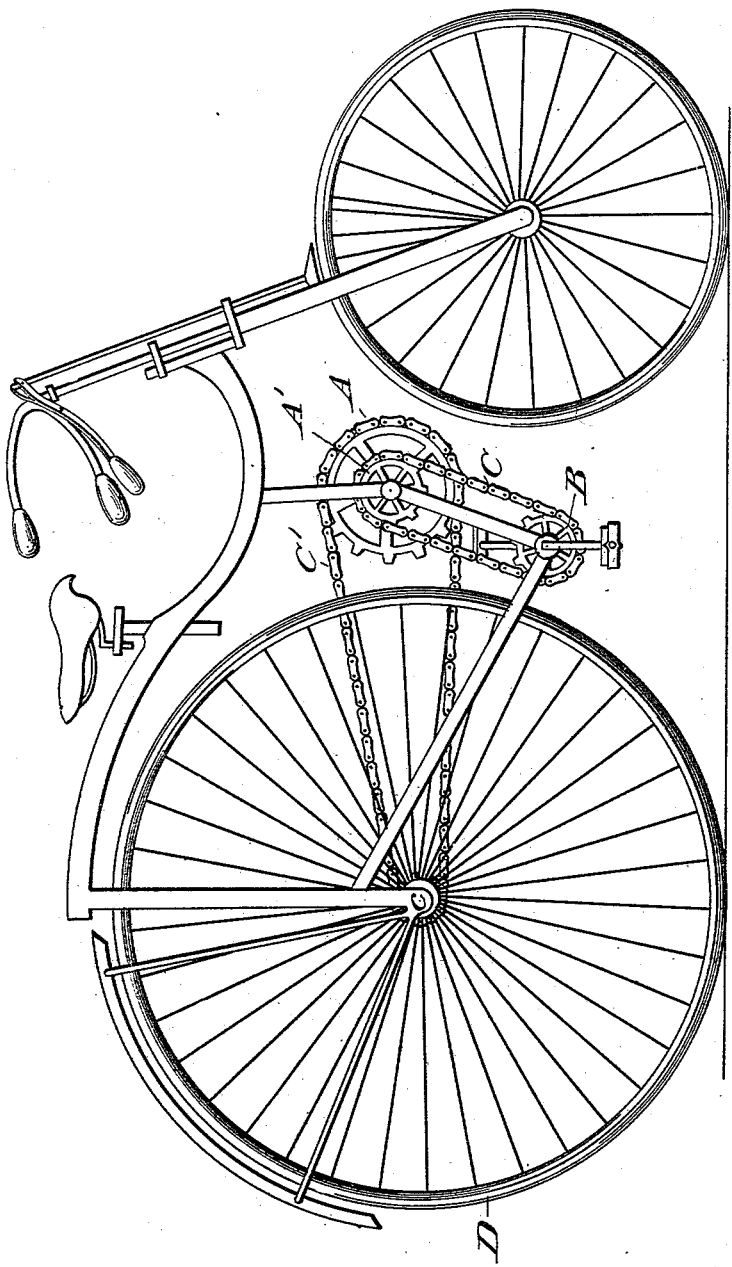
Witnesses:
John H Ellis
Alex. Scott
Inventor:
Charles R. Davenport

UNITED STATES PATENT OFFICE.

CHARLES R. DAVENPORT, OF WASHINGTON, DISTRICT OF COLUMBIA.

BICYCLE.

SPECIFICATION forming part of Letters Patent No. 420,145, dated January 28, 1890.

Application filed August 22, 1889. Serial No. 321,683. (No model.)

*To all whom it may concern:*

Be it known that I, CHARLES R. DAVENPORT, of the city of Washington and District of Columbia, have invented certain new and useful Improvements in Bicycles, of which the following is a specification.

My invention has reference to bicycles; and the object of the invention is to increase the speed of bicycles without any additional physical exertion on the part of the rider than at present is exercised.

My invention consists in the arrangement and adaptation of a train of gear-wheels for propelling a bicycle.

In the accompanying drawing, forming part of this specification, the figure is a side view of a bicycle with my invention attached.

A is the large gear-wheel, which gives increased speed to the bicycle.

A' is the small gear-wheel, connected with gear-wheel A on the same axle.

B is the gear-wheel to which the treadles are attached.

C is the gear-chain connecting gear-wheels B and A'.

C' is the gear-chain connecting the gear-wheels A and c.

In the train of gear-wheels, A' and B are the same size, and are each one-half the diameter of gear-wheel A, and gear-wheel c is one-fourth of the diameter of A.

My invention operates substantially as follows: When the gear-wheel B makes one revolution, it causes the gear-wheel A', by means of the gear-chain C, to make one revolution, and gear-wheel A', being a part of and attached to gear-wheel A on the same axle, causes A to make one revolution. When A makes one revolution, it causes c, by means of the gear-chain C', to make four revolutions, and c, being a part of and joined to the bicycle-wheel D on the same axle, causes it to make four revolutions in the same time. It will thus be seen that when the rider causes the gear-wheel B to revolve once the wheel D, by the mechanism described, will make four revolutions.

While I have described my train of gear-wheels as adapted to a bicycle, it may be applied in other ways, and I do not desire to limit myself to any particular use.

Having described my invention and its operation, what I claim, and desire to secure by Letters Patent, is—

In a bicycle, the combination of the gear-wheels A, A', B, and c, and the gear-chains C and C', arranged and operating substantially as described.

CHARLES R. DAVENPORT.

Witnesses:
SAMUEL A. DRURY,
GEO. I. HILL.